(12) United States Patent
Tanaka (10) Patent No.: US 6,869,149 B2
(45) Date of Patent: Mar. 22, 2005

(54) VEHICLE WHEEL AND METHOD OF MANUFACTURING SAME

(75) Inventor: Takeshi Tanaka, Higashiosaka (JP)

(73) Assignee: Work Co., Ltd., Higashiosaka (JP)

( * ) Notice: Subject to any disclaimer, the term of this patent is extended or adjusted under 35 U.S.C. 154(b) by 0 days.

(21) Appl. No.: 10/368,001

(22) Filed: Feb. 19, 2003

(65) Prior Publication Data

US 2003/0209937 A1 Nov. 13, 2003

(30) Foreign Application Priority Data

| Feb. 18, 2002 | (JP) | ................................ 2002-039578 |
| May 13, 2002 | (JP) | ................................ 2002-136912 |

(51) Int. Cl.$^7$ ............................................. B60B 23/00
(52) U.S. Cl. ............................. 301/63.104; 301/63.106; 29/894.322; 29/894.323
(58) Field of Search ...................... 301/63.101, 63.103, 301/63.104, 63.106, 63.105, 64.301, 64.303; 29/894.32, 894.322, 894.323, 894.351

(56) References Cited

U.S. PATENT DOCUMENTS

| 1,952,404 | A | * | 3/1934 | Woodward | ............. 29/894.323 |
| 3,859,704 | A | * | 1/1975 | Nasson | .................. 29/894.322 |
| 3,874,736 | A | * | 4/1975 | Anderson et al. | ...... 301/63.105 |
| 4,317,597 | A | * | 3/1982 | Golata et al. | .......... 301/63.104 |
| 5,360,261 | A | * | 11/1994 | Archibald et al. | ..... 301/63.107 |
| 5,548,896 | A | * | 8/1996 | Archibald et al. | ..... 29/894.322 |
| 5,697,511 | A | * | 12/1997 | Bampton | .................... 220/4.12 |
| 5,826,948 | A | * | 10/1998 | Schroeder et al. | ..... 301/64.706 |
| 6,036,280 | A | * | 3/2000 | Stanavich | .............. 301/63.103 |
| 6,138,355 | A | * | 10/2000 | Grassi | .................... 29/894.323 |
| 6,447,071 | B1 | * | 9/2002 | Griffin | .................... 301/63.104 |

FOREIGN PATENT DOCUMENTS

EP          0854792          * 7/1998

* cited by examiner

*Primary Examiner*—Russell D. Stormer
(74) *Attorney, Agent, or Firm*—Armstrong, Kratz, Quintos, Hanson & Brooks, LLP (57) ABSTRACT

It is an object of the present invention to provide a vehicle wheel which can be manufactured at low cost, exhibits superior design characteristics, and with which mechanical strength can be adequately ensured. The vehicle wheel has a construction that is split into an outer-rim member that constitutes an outer-rim part, and a wheel-constituting member comprising an integral molding that constitutes an inner-rim part and disk part, wherein the outer-rim member end portion on the attachment face side is formed so as to be capable of fitting over the wheel-constituting member; an annular groove is formed in the engaging face of the wheel-constituting member which engages with the outer-rim member; and the outer-rim member is integrally fastened to the wheel-constituting member by press-fitting the outer-rim member end portion on the attachment face side inside the annular groove.

5 Claims, 8 Drawing Sheets

VEHICLE WHEEL AND METHOD OF MANUFACTURING SAME

BACKGROUND OF THE INVENTION

1. Field of the Invention

The present invention relates to a vehicle wheel.

2. Description of the Related Art

One-piece type wheels which are integrally formed by casting, two-piece type wheels having a construction that is split into a rim member and a disk member, and three-piece type wheels having a construction that is split into an inner-rim member, an outer-rim member and a disk member, are widely used as vehicle wheels that comprise light alloys such as aluminum alloys and the like.

Where two-piece type wheels and three-piece type wheels are concerned, wheels in which the disk member is manufactured by casting or forging and the rim member is constructed from a rolled material that is superior in terms of processing characteristics and brightness have been put to practical use. Rim members used include members for which a plate-like rolled material is rolled up to form a tube and both ends of this material are welded together, whereupon the member is molded into the desired shape by spinning, as well as members for which a disk-like rolled material is molded into a cylindrical shape with a bottom, whereupon the bottom is cut away to make a tubular molding which is molded into the desired shape by spinning, before being polished and subjected to a surface treatment.

Further, one-piece type wheels are superior in terms of mass production characteristics. However, the mold used is large and complex so that molds are required for each size, and hence the cost of manufacturing the wheel is high. Accordingly, when production numbers are small, It is preferable to split the construction into two pieces or three pieces and to manufacture the disk member alone by casting or forging. Furthermore, where two-piece or three-piece type wheels are concerned, the outer-rim part can be constructed from a rolled material with a fine texture. The design face side of the outer-rim part can therefore be formed having a lustrous surface, whereby the design characteristics of the wheel can be improved.

However, where three-piece type wheels are concerned, the number of parts is higher and there is a corresponding increase in the manufacturing costs. With two-piece type wheels, although there are fewer parts, there is the problem that because the disk member is disposed on the inside of the rim member, the mechanical strength of the wheel drops due to thermal degradation of the welded section in which these members are directly welded together.

Accordingly, a vehicle wheel like the aluminum vehicle wheel disclosed in Japanese Utility Model Laid-Open Application No. 58-54303 has also been proposed, this wheel being a vehicle wheel with a construction that is split into an outer-rim member which constitutes an outer-rim part, and a wheel-constituting member comprising an integral molding that constitutes an inner-rim part and a disk part, wherein an annular fastening part which extends inward is formed on the outer-rim member end portion on the attachment face side, and an assembly face which is oriented perpendicular to the axial center is formed on the circumferential portion of the wheel-constituting member on the design face side thereof so that the fastening part of the outer-rim member overlaps the assembly face of the wheel-constituting member and the fastening part and the assembly face are integrally joined by means of a plurality of nuts and bolts which are disposed at intervals in the circumferential direction.

This wheel is such that the outer-rim member can be manufactured easily and inexpensively from a rolled material or the like, and the wheel-constituting member that constitutes the inner-rim part and disk part can be manufactured by casting or forging. Although a large mold must be used in comparison to a case where the disk member alone is manufactured by casting or forging as is true for two-piece and three-piece type wheels and so forth, the wheel can be manufactured using a mold that is smaller and less expensive than that used for a one-piece type wheel which is manufactured by casting of the entire wheel. Furthermore, there are fewer parts than for a three-piece type wheel, and therefore this wheel can be manufactured at a lower cost than a three-piece type wheel. Furthermore, the outer-rim member is constructed from a rolled material with a fine texture, meaning that a lustrous ornamental surface with superior design characteristics can be formed on the outer-rim part on the design face side thereof in the same manner as for two-piece type and three-piece type wheels.

However, the vehicle wheel above has been confronted by the problem that because the outer-rim member and the wheel-constituting member are joined to one another by means of a plurality of nuts and bolts which are disposed at fixed intervals in a circumferential direction, there is a larger number of parts and manufacturing costs are higher, and it takes a long time to tighten the bolts, which results is a corresponding decline in producibility.

SUMMARY OF THE INVENTION

It is accordingly an object of the present invention to provide a vehicle wheel of high producibility which exhibits superior design characteristics, can be manufactured at low cost, and with which mechanical strength is adequately ensured.

A first vehicle wheel according to the present invention is a vehicle wheel with a construction that is split into an outer-rim-member which constitutes an outer-rim part, and a wheel-constituting member comprising an integral molding that constitutes an inner-rim part and a disk part, wherein the outer-rim member end portion on the attachment face side is formed so as to be capable of fitting over the wheel-constituting member: an annular groove is formed in the engaging face of the wheel-constituting member which engages with the outer-rim member: and the outer-rim member is integrally fastened to the wheel-constituting member by press-fitting the outer-rim member end portion on the attachment face side inside the annular groove.

This first vehicle wheel is such that the outer-rim member can be manufactured easily and inexpensively from a rolled material or the like, and the wheel-constituting member that constitutes the inner-rim part and disk part can be manufactured by casting or forging. Although a large mold must be used in comparison to a case where the disk member alone is manufactured by casting or forging as is true for two-piece and three-piece type wheels and so forth, the wheel can be manufactured using a mold that is smaller and less expensive than that used for a one-piece type wheel which is manufactured by casting of the entire wheel. Furthermore, there are fewer parts than for a three-piece type wheel, and therefore this wheel can be manufactured at a lower cost than a three-piece type wheel.

Further, the outer-rim member is constructed from a rolled material with a fine texture, meaning that a lustrous ornamental surface with superior design characteristics can be formed on the outer-rim part on the design face side thereof in the same manner as for two-piece type and three-piece type wheels.

Furthermore, this wheel is such that the outer-rim member end portion on the attachment face side is fitted over the wheel-constituting member, and the outer-rim member is fitted over and fastened to the wheel-constituting member by spinning or the like, meaning that it is possible to prevent the inconvenience which is caused by a drop in the mechanical strength of the wheel as a result of thermal degradation as is the case when the outer-rim member and the wheel-constituting member are joined by welding, and, in comparison to a case where the outer-rim member and the wheel-constituting member are fastened by means of a plurality of nuts and bolts, there are fewer parts constituting the wheel and hence manufacturing costs can be reduced, and the work to tighten the bolts is not required, whereby the producibility can be improved.

Here, a reinforcing covering part that covers the end portion of the outer-rim member which is press-fitted inside the annular groove is preferably formed on the attachment face side of the annular groove in the wheel-constituting member. Such a constitution is preferable because same makes it possible to greatly increase the strength of the join between the wheel-constituting member and the outer-rim member.

The end portion of the outer-rim member may be joined to the wheel-constituting member by friction stir welding (FSW). Because, in comparison to ordinary welding, friction stir welding permits suppression of a temperature rise during the joining, when the outer-rim member and the wheel-constituting member are joined by friction stir welding, the strength of the join between the outer-rim member and the wheel-constituting member can be greatly improved while preventing a drop in the mechanical strength of the wheel as a result of thermal degradation.

A second vehicle wheel according to the present invention is a vehicle wheel with a construction that is split into an outer-rim member which constitutes an outer-rim part, and a wheel-constituting member comprising an integral molding that constitutes an inner-rim part and a disk part, wherein the end portion of the outer-rim member is joined to the wheel-constituting member by friction stir welding so that the outer-rim member is integrally fastened to the wheel-constituting member.

The second vehicle wheel provides basically the same effect as the first vehicle wheel, and the outer-rim member can be manufactured easily and at low cost from a rolled material or the like. Further, although a large mold must be used in comparison to two-piece and three-piece type wheels and so forth, the wheel can be manufactured using a mold that is smaller and less expensive than that used for a one-piece type wheel which is manufactured by casting of the entire wheel. Furthermore, there are fewer parts than for a three-piece type wheel, and therefore this wheel can be manufactured at a lower cost than a three-piece type wheel. Further, the outer-rim member is constructed from a rolled material with a fine texture, meaning that a lustrous ornamental surface with superior design characteristics can be formed on the outer-rim part on the design face side thereof in the same manner as for two-piece type and three-piece type wheels.

Moreover, this vehicle wheel is such that the end portion of the outer-rim member is joined to the wheel-constituting member by friction stir welding so that the outer-rim member is integrally fastened to the wheel-constituting member.

Therefore, in comparison to ordinary welding, a temperature rise during the joining can be suppressed, and hence the strength of the join between the outer-rim member and the wheel-constituting member can be adequately ensured while preventing a drop in the mechanical strength of the wheel as a result of thermal degradation. Further, in comparison to a case where the outer-rim member and the wheel-constituting member are fastened by means of a plurality of nuts and bolts, there are fewer parts constituting the wheel and hence manufacturing costs can be reduced, and the work to tighten the bolts is not required, whereby the producibility can be improved.

The manufacturing method for the first vehicle wheel according to the present invention is a vehicle wheel manufacturing method, wherein a substantially tubular outer-rim member which constitutes an outer-rim part is manufactured using a rolled plate; a wheel-constituting member comprising an inner-rim part and a disk part is manufactured by forging or casting; the outer-rim member end portion on the attachment face side is formed so as to be capable of fitting over the wheel-constituting member; an annular groove is formed in the engaging face of the wheel-constituting member which engages with the outer-rim member; and the outer-rim member is integrally fastened to the wheel-constituting member by pressure-deforming the outer-rim member end portion on the attachment face side so that this end portion is press-fitted inside the annular groove. In this case, an effect like that for the first vehicle wheel is obtained.

Here, the manufacturing method is preferably such that an annular groove is formed in the wheel-constituting member and a flange part is formed so as to follow the annular groove on the attachment face side of the annular groove in the wheel-constituting member; the outer-rim member is mounted by being fitted over the wheel-constituting member until the outer-rim member end portion on the attachment face side contacts the flange part, whereupon the outer-rim member end portion on the attachment face side is pressure-deformed so as to be press-fitted inside the annular groove; and the flange part is then pressure-deformed so that a reinforcing covering part, which covers the outer-rim member end portion on the attachment face side which is press-fitted inside the annular groove, is formed. As a result of such a constitution, the outer-rim member can be aligned easily in the axial direction thereof with the wheel-constituting member, and the flange part for this alignment is preferably used to form a reinforcing covering part because same makes it possible to greatly increase the strength of the join of the outer-rim member to the wheel-constituting member.

The end portion of the outer-rim member may be joined to the wheel-constituting member by friction stir welding after the outer-rim member is fastened to the wheel-constituting member. Because, in comparison to ordinary welding, friction stir welding permits suppression of a temperature rise during the joining, when the outer-rim member and the wheel-constituting member are joined by friction stir welding, the strength of the join between the outer-rim member and the wheel-constituting member can be improved while preventing a drop in the mechanical strength of the wheel as a result of thermal degradation.

The manufacturing method for the second vehicle wheel according to the present invention is a vehicle wheel manufacturing method, wherein a substantially tubular outer-rim member which constitutes an outer-rim part is manufactured using a rolled plate; a wheel-constituting member comprising an inner-rim part and a disk part is manufactured by forging or casting; and the end portion of the outer-rim member is joined to the wheel-constituting member by friction stir welding so that the outer-rim member is integrally fastened to the wheel-constituting member. In this case, an effect like that for the second vehicle wheel can be obtained.

DESCRIPTION OF THE PREFERRED EMBODIMENTS

Embodiments of the present invention will be described below with reference to the drawings.

Figure 1:
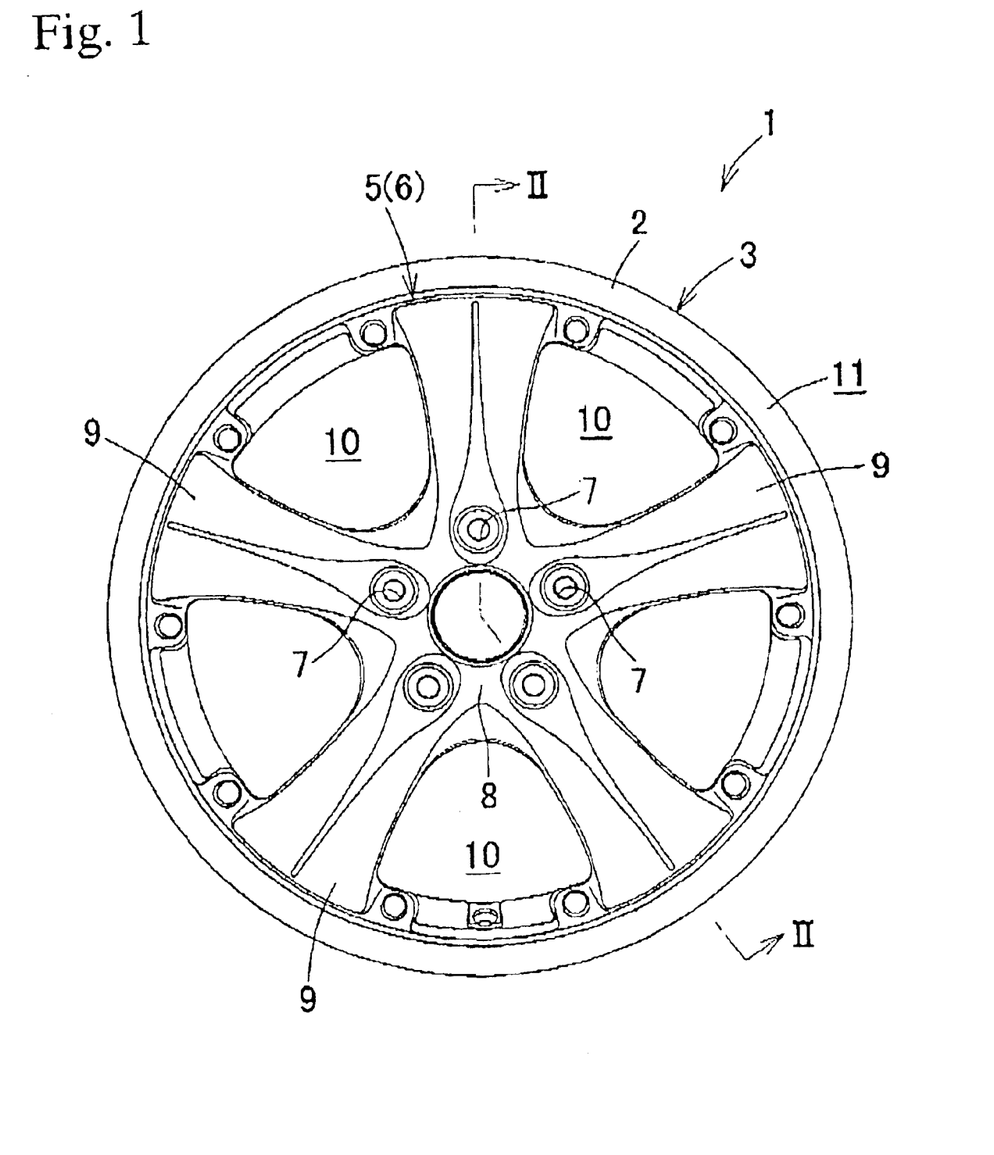
FIG. 1 is a front view of the wheel.
Figure 2:
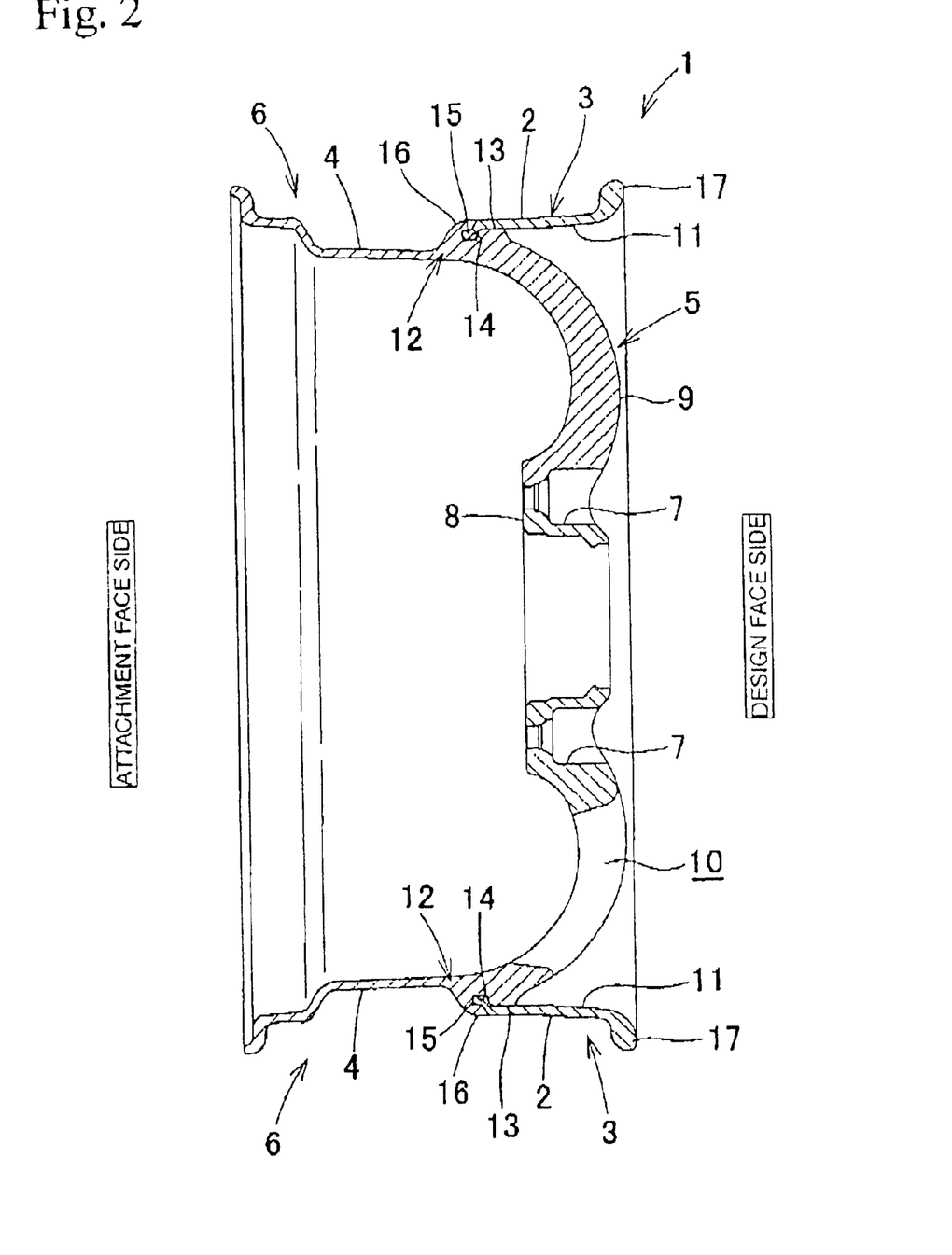
FIG. 2 is a sectional view along the line II—II in FIG. 1.

As is shown in FIGS. 1 and 2, a vehicle wheel 1 has a construction that is split into an outer-rim member 3 which constitutes an outer-rim part 2, and a wheel-constituting member 6 comprising an integral molding that constitutes an inner-rim part 4 and a disk part 5.

A boss part 8 which has five bolt through-holes 7 used to attach a wheel 1 to a wheel supporting member of a suspension apparatus (not shown in the figures) is provided in the central portion of the disk part 5, and the boss part 8 and inner-rim part 4 are integrally connected by five spoke parts 9 that are radially disposed at fixed intervals in the circumferential direction, with ornamental holes 10 being formed between adjacent spoke parts 9. However, the number of bolt through-holes 7 is set in accordance with the number of bolts provided in the wheel supporting member. Furthermore, the number, shape and layout of the spoke parts 9 can be set as desired in accordance with the design and strength of the wheel 1.

The outer-rim member 3 is manufactured as follows: a plate-like rolled material made of a light alloy such as an aluminum alloy, magnesium alloy or the like is rolled up into a tubular shape, and both ends thereof are welded to form a tubular member which is formed into the desired shape by spinning or the like. Alternatively, a rolled material made of a light alloy such as an aluminum alloy, magnesium alloy or the like is stamped into the form of a disk which is press-molded into a cylindrical shape with a bottom like that of a wash basin, whereupon the bottom surface is cut away to form a tubular member which is formed into the desired shape by spinning or the like. Such an outer-rim member 3 constructed from rolled material has a fine texture, and therefore the ornamental surface 11 on the design face side can be processed to produce a lustrous surface, thus improving the design characteristics of the wheel 1. However, a member formed using a ferrous metal plate such as a steel plate, stainless steel plate or the like may also be adopted as the outer-rim member 3.

The wheel-constituting member 6 is manufactured by casting or forging a light alloy such as an aluminum alloy, magnesium alloy or the like. Since the wheel-constituting member 6 is constituted without an outer-rim member 3. This wheel-constituting member 6 can be formed with a correspondingly smaller size, and the mold used to manufacture the wheel-constituting member 6 can be made proportionately smaller, whereby the manufacturing costs can be reduced and a rise in the manufacturing costs for the wheel 1 can be suppressed.

Figure 3:
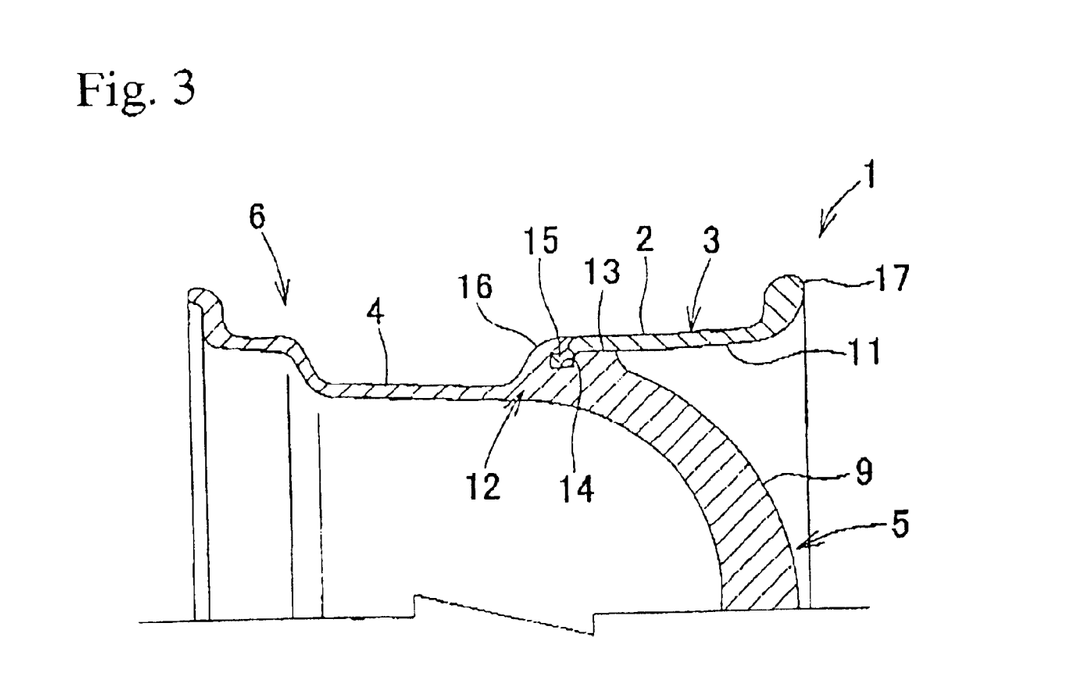
FIG. 3 is an explanatory diagram of the attachment construction.

A description will now be provided for an attachment structure 12 whereby the outer-rim member 3 is attached to the wheel-constituting member 6. As shown in FIGS. 1 to 3, a substantially tubular engaging face 13 is formed on the end portion of the inner-rim part 4 on the design face side; an annular groove 14 which opens outward in the radial direction is formed on the attachment face side of the engaging face 13; the vicinity of the end portion of the outer-rim member 3 on the attachment face side is fitted over the engaging face 13; this end portion of the outer-rim member 3 on the attachment face side is pressure-deformed by spinning or the like as described subsequently so that a constricted part 15 which is press-fitted inside the annular groove 14 is formed; and the attachment face side of the annular groove 14 is pressure-deformed by spinning or the like as described subsequently so that a reinforcing covering part 16 externally mounted so as to cover the constricted part 15 is formed.

Further, it is preferable that the joining of the wheel-constituting member 6 and outer-rim member 3 be accomplished without welding. However, in cases where adequate attachment strength cannot be ensured, the strength of the join between the wheel-constituting member 6 and outer-rim member 3 may be further increased by performing welding between the end portions of the reinforcing covering part 16 and outer-rim member 3.

Next, the manufacturing method for the wheel 1 will be described.

Figure 4:
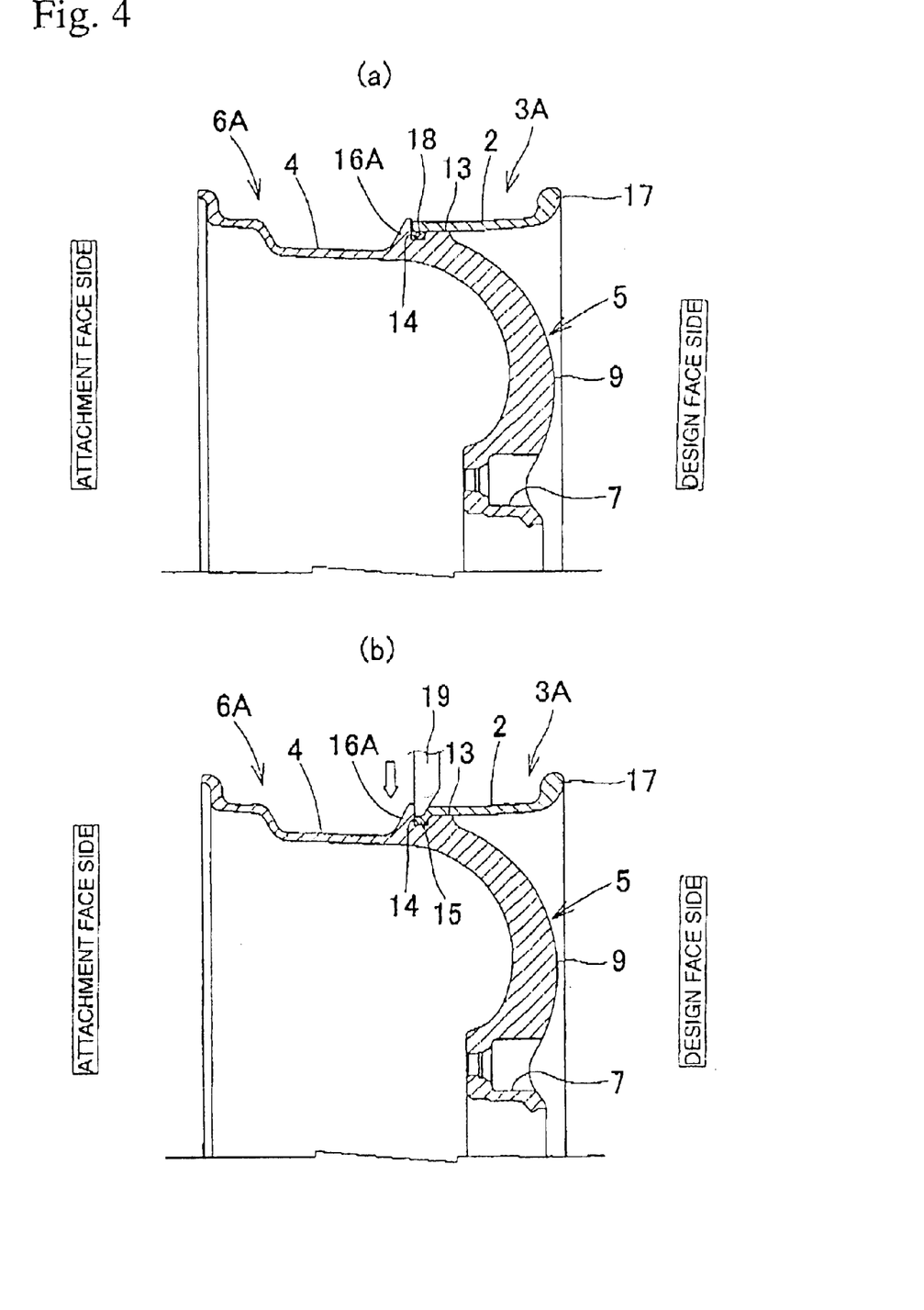
FIGS. 4(a) and 4(b) are respective explanatory diagrams of manufacturing methods for wheels with the same or other constructions.

First, an outer-rim member 3A and a wheel-constituting member 6A with the cross-sectional shapes shown in FIG. 4(a) are manufactured.

Where the outer-rim member 3A is concerned, a plate-like rolled material made of a light alloy such as an aluminum alloy, magnesium alloy or the like is rolled up into a tubular shape, and both ends of this material are welded to form a tubular member which is then formed into the desired shape by spinning or the like. Alternatively, a rolled material made of a light alloy such as an aluminum alloy, magnesium alloy or the like is stamped into the form of a disk which is then press-molded into a cylindrical shape with a bottom like that of a wash basin, whereupon the bottom surface is cut away to form a tubular member, this tubular member being formed into a substantially cylindrical outer-rim member 3A with a flange part 17 on the end portion on the design face side by spinning or the like.

The wheel-constituting member 6A is manufactured by casting or forging a light alloy such as an aluminum alloy, magnesium alloy or the like. Then, a substantially tubular engaging face 13 which is fitted inside the end portion of the outer-rim member 3A on the attachment face side is formed on the end portion on the design face side of the inner-rim part 4 of the wheel-constituting member 6A; an annular groove 14 which opens outward in the radial direction is formed on the attachment face side of the engaging face 13; and a flange part 16A is formed on the attachment face side of the annular groove 14. The engaging face 13, annular groove 14 and flange part 16A may also be integrally molded by casting or forging, or may be formed by a subsequent process.

Next, in a state in which sealant 18 such as soft rubber or the like is disposed inside the annular groove 14 of the wheel-constituting member 6A as shown in FIG. 4(a), the end portion of the outer-rim member 3A on the attachment face side is fitted over the engaging face 13 of the wheel-constituting member 6A until the distal end portion of the outer-rim member 3A on the attachment face side contacts the flange part 16A.

Next, as is shown in FIG. 4(b), a roller 19 is pressed against the end portion of the outer-rim member 3A on the attachment face side while the wheel-constituting member 6A and outer-rim member 3A are rotated, thus pressing and deforming this end portion toward the center of rotation of the wheel-constituting member 6A so that a constricted part 15 which is press-fitted inside the annular groove 14 is formed, and the outer-rim member 3 is fastened to the wheel-constituting member 6A by means of this constricted part 15. However, as long as the constricted part 15 is formed by applying pressure to deform the end portion of the outer-rim member 3A on the attachment face side, this part may be formed by spinning using a lancet, or by a process other than spinning such as press-molding or the like, for example, instead of the above-described spinning process using the roller 19.

Next, the flange part 16A is pressure-deformed by means of a roller (not shown in the figures) while the outer-rim member 3 and wheel-constituting member 6A are rotated, so that a reinforcing covering part 16 that covers the constricted part 15 of the outer-rim member 3 is formed, thus producing a wheel 1 in which the outer-rim member 3 is engaged with and fastened to the wheel-constituting member 6. However, like the constricted part 15, the reinforcing covering part 16 may also be formed by a method other than spinning using a roller.

In the manufacturing method for this wheel 1, the outer-rim member 3A and wheel-constituting member 6A can basically be joined by press-fitting the end portion of the outer-rim member 3A on the attachment face side inside the annular groove 14 of the wheel-constituting member 6A, and therefore, in comparison to a case where same are welded, it is possible to prevent the thermal degradation of the wheel-constituting member 6 and outer-rim member 3 which would otherwise result from the heat of welding. Furthermore, since the amount of insertion of the outer-rim member 3A with respect to the wheel-constituting member 6A can be set by providing the flange part 16A, the assembly characteristics of the outer-rim member 3A with respect to the wheel-constituting member 6A can be improved. Furthermore, since a reinforcing covering part 16 formed by applying pressure to deform the flange part 16A is externally mounted on the constricted part 15 of the outer-rim member 3A, the strength of the attachment of the outer-rim member 3 to the wheel-constituting member 6 can be greatly increased. However, in cases where an adequate strength of attachment of the outer-rim member 3 to the wheel-constituting member 6 cannot be obtained, the end portion of the outer-rim member 3 and the reinforcing covering part 16 may be welded together, or may be joined by friction stir welding (FSW), after formation of the reinforcing covering part 16.

A description will be provided next for further embodiments arrived at by partially modifying the above construction of the wheel 1. The same reference numerals are assigned to the parts which are the same as those of the above embodiment, and hence a detailed description of such parts is omitted here.

Figure 5:
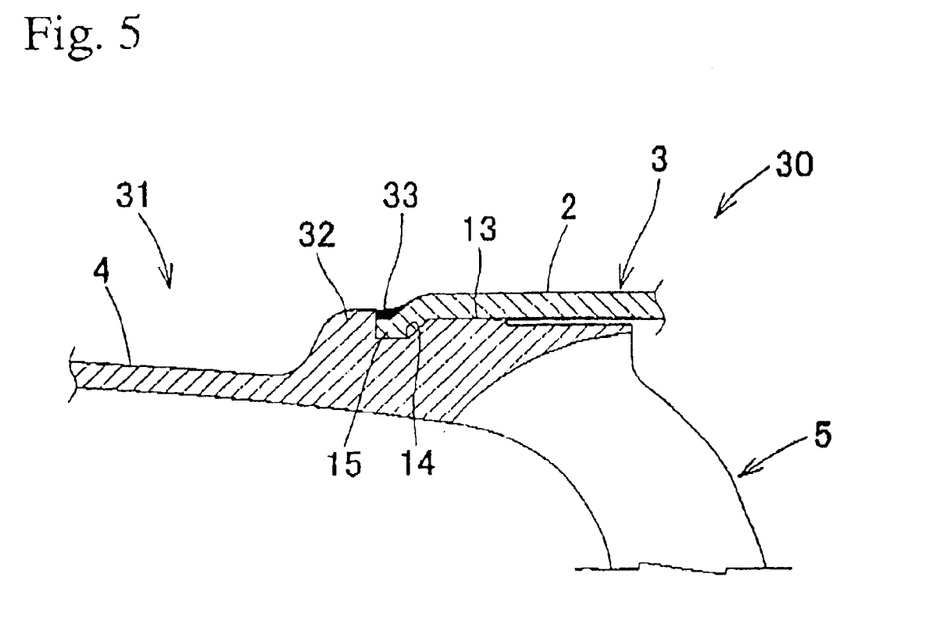
FIG. 5 is an explanatory diagram of another manufacturing method.

(1) As per the wheel 30 shown in FIG. 5, a constitution is adopted for the wheel-constituting member 31 in which a flange part 32 which has a slightly smaller diameter than that of the flange part 16A is formed in place of the flange part 16A and in which the reinforcing covering part 16 is omitted. Sealant is made to fill the section of the join between the flange part 32 and the constricted part 15, and then a seal portion 33 produced by aluminum welding, brazing, or soldering or the like is formed whereby the characteristics of the seal between the outer-rim member 3 and the wheel-constituting member 31 may be improved.

Figure 6:
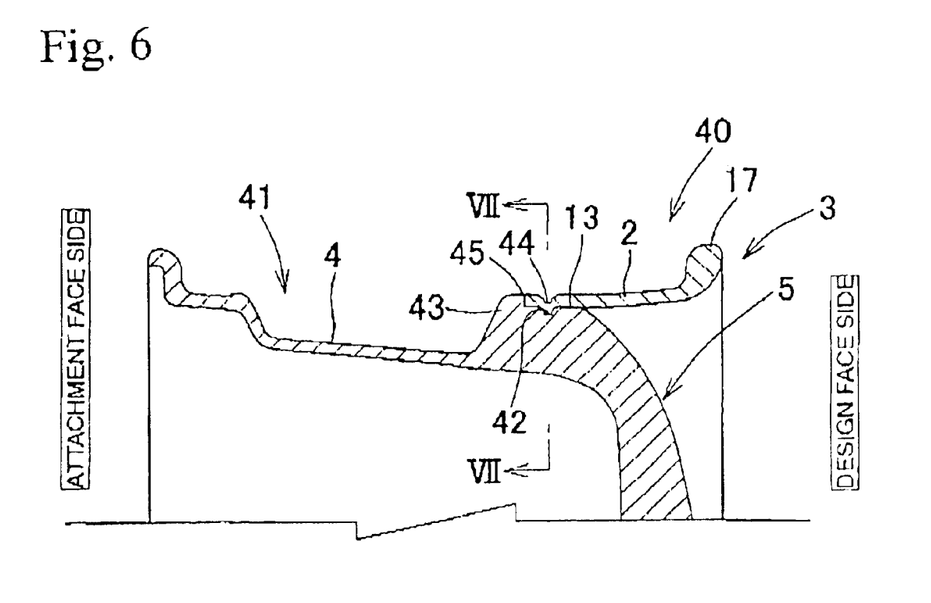
FIG. 6 is a longitudinal sectional view of the essential parts of a wheel with another construction.

(2) As per the wheel 40 shown in FIG. 6, a constitution is adopted for the wheel-constituting member 41 in which an annular groove 42 is formed at a midway point of the engaging face 13 in the width direction thereof in place of the annular groove 14, and in which a flange part 43 whose circumferential face is constituted so as extend smoothly from the external face of the outer-rim member 3 is formed instead of the flange part 16A. The end portion of the outer-rim member 3 on the attachment face side is provided with a constricted part 44 formed by spinning, meaning that the wheel-constituting member 41 and the outer-rim member 3 may be integrated by means of the constricted part 44. A constitution is also possible in which a join section 45, which results when the end portion of the outer-rim member 3 on the attachment face side is joined to the flange part 43 of the wheel-constituting member 41 by friction stir welding or the like, is formed, the strength of the join between the wheel-constituting member 41 and the outer-rim member 3 being increased by this join section 45.

Figure 7:
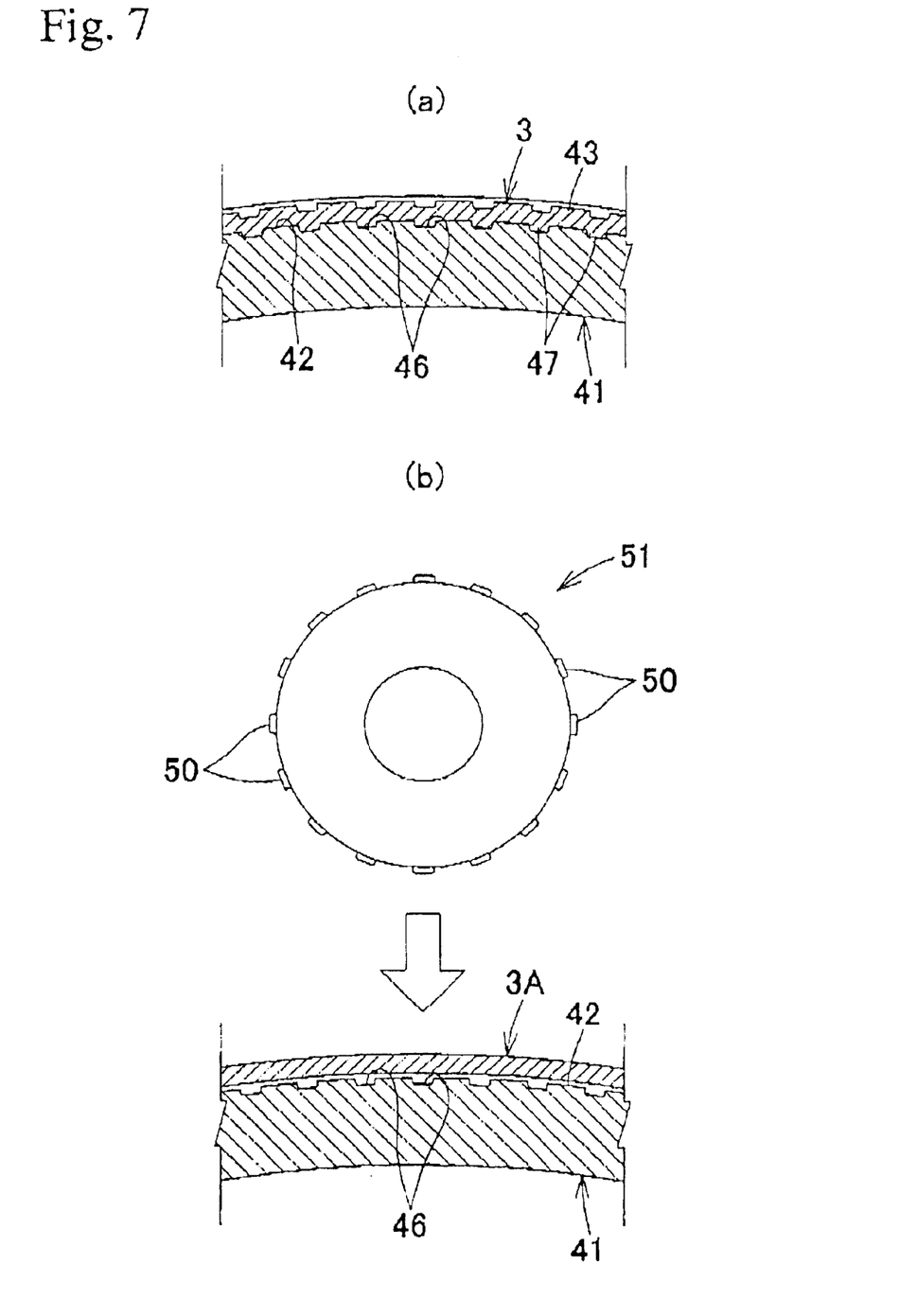
FIG. 7(a) is a sectional view along the line VII—VII in FIG. 6.
FIG. 7(b) is an explanatory diagram of the manufacturing method for the wheel.

Furthermore, as shown in FIG. 7(a), a constitution is possible in which latching grooves 46 are formed at fixed intervals in the circumferential direction in the deep-end face of the annular groove 42, and caulking portions 47 that engage with the latching grooves 46 are formed on the outer-rim member 3, so as to more effectively prevent relative rotation of the wheel-constituting member 41 and the outer-rim member 3. Further, the pitch and length of the caulking portions 47 may be set as desired in accordance with the rim diameter and so forth. Also, these caulking portions 47 can be similarly formed for the above-described wheels 1, 30.

Furthermore, when the wheel 40 is assembled, for example, as shown in FIG. 7(b), the outer-rim member 3A is mounted by being fitted over the engaging face 13 until the end portion of the outer-rim member 3A on the attachment face side contacts the flange part 43. Thereafter, while a substantially disk-like pressing tool 51 whose circumferential portion is formed having protrusions 50 at fixed intervals in the circumferential direction is caused to make contact under pressure at a position that corresponds with the annular groove 42 in the outer-rim member 3A, the pressing tool 51, and the wheel-constituting member 41 and outer-rim member 3A are made to turn in mutually opposite directions and in sync with one another, such that the outer-rim member 3 is pressure-deformed in the annular groove 42 so as to form the constricted part 44, and the outer-rim member 3 is pressure-deformed in the latching grooves 46 by the protrusions 50 so as to form the caulking portions 47 which are thus pressure-fitted inside the latching grooves 46.

Figure 8:
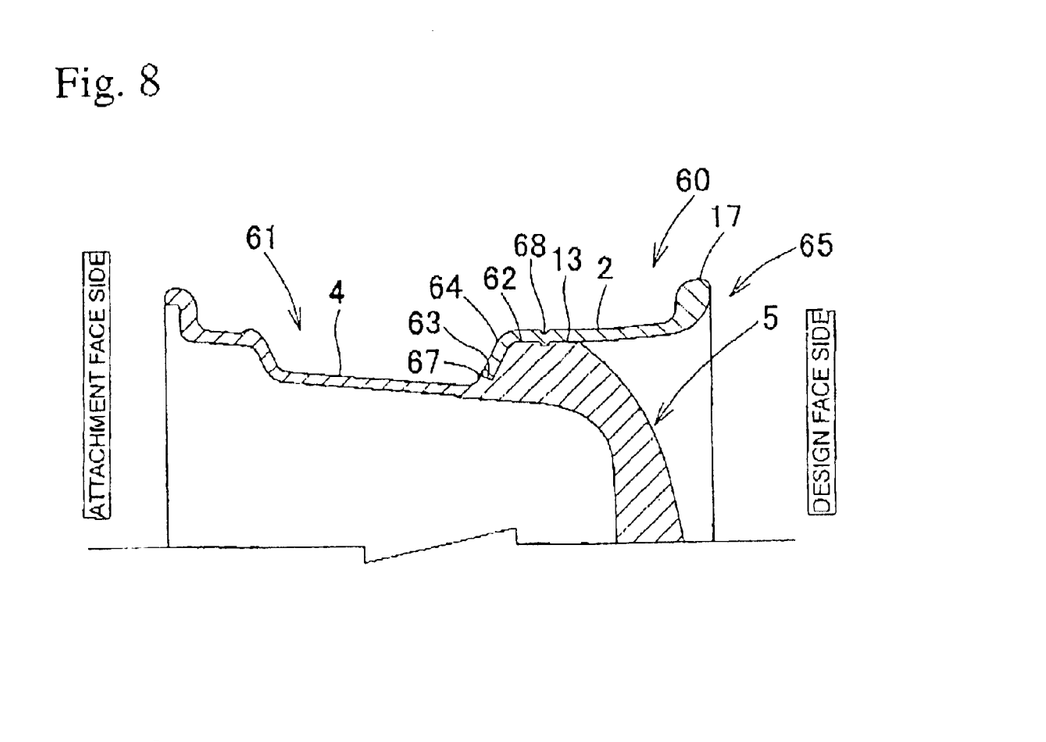
FIG. 8 is a longitudinal sectional view of the essential parts of a wheel with another construction.

(3) As per the wheel 60 shown in FIG. 8, a constitution is adopted for the wheel-constituting member 61 in which the annular groove 14 and the flange part 16A are omitted, and an engaging face 62, which extends from the engaging face 13 and extends toward the attachment face side in a shape whose cross-section is substantially an inverted 'V'. is formed, while a receiving face 63 is formed on the end portion of the engaging face 62 on the attachment face side. In place of the outer-rim member 3, an outer-rim member 65 comprising a constricted part 64 which is constricted by spinning or the like so as to have a shape whose cross-section is substantially an inverted "V", so that the wheel-constituting member 61 and the outer-rim member 65 may be integrated by this constricted part 64. Further, with this wheel 60 also, similarly to the above embodiment, a join section 67, which results when the end portion of the outer-rim member 65 on the attachment face side is joined to the receiving face 63 of the wheel-constituting member 61 by friction stir welding, is formed, the strength of the join between the wheel-constituting member 61 and the outer-rim member 65 being preferably improved by this join section 67. Further, similarly to the above-described wheel 40, in order to regulate the relative rotation of the wheel-constituting member 61 and the outer-rim member 65, a plurality of caulking portions 68 may be formed at intervals in the circumferential direction at a midway point in the section of engagement between the wheel-constituting member and the outer-rim member.

(4) The outer-rim member and the wheel-constituting member can also be joined by friction stir welding.

Figure 9:
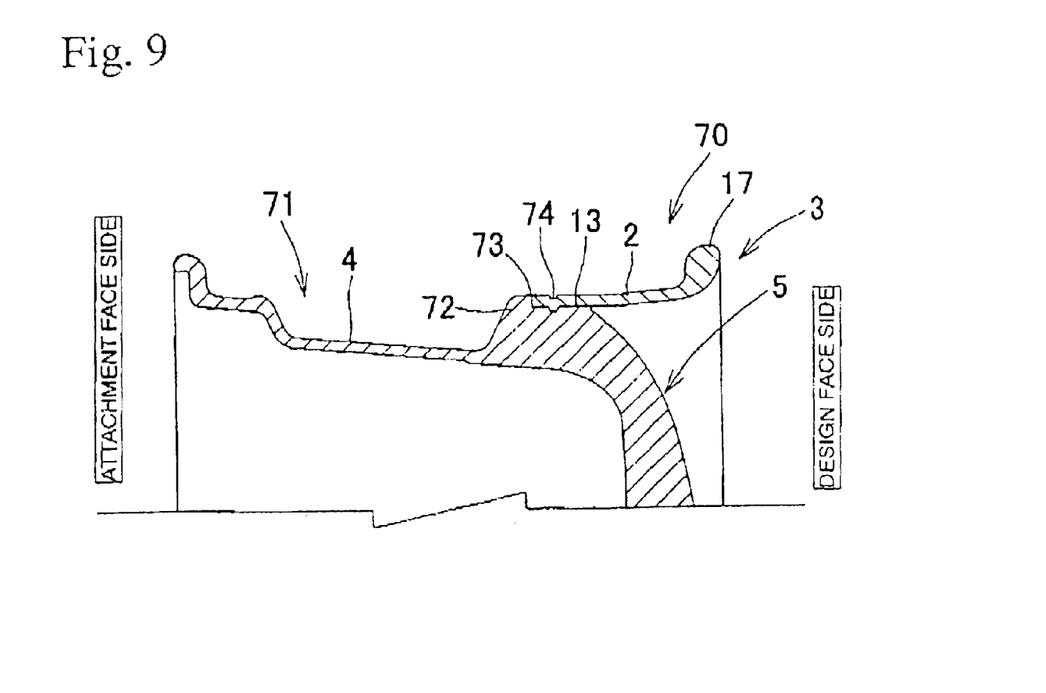
FIG. 9 is a longitudinal sectional view of the essential parts of a wheel with another construction.

For example, as per the wheel 70 shown in FIG. 9, a constitution is adopted for the wheel-constituting member 71 in which the annular groove 14 is omitted, and in which a flange part 72 constituted so that the circumferential face thereof extends smoothly from the external face of the outer-rim member 3 is provided instead of the flange part 16A. The outer-rim member 3A is mounted by being fitted over the engaging face 13 until the end portion of the outer-rim member 3A on the attachment face side contacts the flange part 72, meaning that a join section 73, which results from a join produced by friction stir welding between the end portion of the outer-rim member 3A on the attachment face side and the flange part 72 may be formed. With this wheel 70 also, similarly to the above-described wheel 40, in order to regulate the relative rotation of the wheel-constituting member 71 and the outer-rim member 3, a plurality of caulking portions 74 may be formed at intervals in the circumferential direction at a midway point in the section of engagement between the wheel-constituting member and the outer-rim member.

Further, in the case of the above-described wheel 70 in which the outer-rim member and the wheel-constituting member are joined by friction stir welding, any desired constitution can be adopted for the outer-rim member and the wheel-constituting member as long as a constitution is adopted which allows the end portion of the outer-rim member to confront the wheel-constituting member and permits friction stir welding therebetween upon application of a special tool. Further, nuts and bolts serving to join together the outer-rim member and the wheel-constituting member may be provided at fixed intervals in the circumferential direction, in combination with friction stir welding.

According to the first vehicle wheel and method of manufacturing same of the present invention, a lustrous ornamental surface with superior design characteristics can be formed on the outer-rim part on the design face side thereof in the same manner as for conventional two-piece type and three-piece type wheels; furthermore, the wheel can be assembled without welding in the same manner as for a conventional three-piece type wheel while keeping the manufacturing costs at the same level as those of a conventional two-piece type wheel. Further, the wheel-constituting member and the outer-rim member can be joined easily by spinning or the like, and therefore, unlike a case where the join is made by welding, it is possible to prevent the inconvenience which is caused by a drop in the mechanical strength of the wheel as a result of thermal degradation and, in comparison to a case where the outer-rim member and the wheel-constituting member are fastened by means of a plurality of nuts and bolts, there are fewer parts constituting the wheel and hence manufacturing costs can be reduced, and the work to tighten the bolts is not required, whereby the producibility can be improved.

Therefore, a reinforcing covering part, which covers the outer-rim member end portion which is press-fitted inside the annular groove, is preferably formed on the attachment face side of the annular groove in the wheel-constituting member because this reinforcing covering part makes it possible to greatly improve the strength of the join between the wheel-constituting member and the outer-rim member.

When the end portion of the outer-rim member is friction-stir-welded to the wheel-constituting member, a temperature rise during the joining is suppressed, meaning that the strength of the join between the wheel-constituting member and the outer-rim member can be increased while preventing a drop in the mechanical strength of the wheel as a result of thermal degradation.

According to the second vehicle wheel and method of manufacturing same of the present invention, a lustrous ornamental surface with superior design characteristics can be formed on the outer-rim part on the design face side thereof in the same manner as for conventional two-piece type and three-piece type wheels; furthermore, the wheel can be assembled without welding in the same manner as for a conventional three-piece type wheel while keeping the manufacturing costs at the same level as those of a conventional two-piece type wheel. Further, the end portion of the outer-rim member is joined to the wheel-constituting member by friction stir welding so that the outer-rim member is integrally fastened to the wheel-constituting member. Therefore, in comparison to ordinary welding, a temperature rise during the joining can be suppressed, and hence the strength of the join between the outer-rim member and the wheel-constituting member can be adequately ensured while preventing a drop in the mechanical strength of the wheel as a result of thermal degradation. Further, in comparison to a case where the outer-rim member and the wheel-constituting member are fastened by means of a plurality of nuts and bolts, there are fewer parts constituting the wheel and hence manufacturing costs can be reduced, and the work to tighten the bolts is not required, whereby the producibility can be improved.

Moreover, the manufacturing method for the first vehicle wheel is such that, in a case where an annular groove is formed in the wheel-constituting member and a flange part is formed so as to follow the annular groove on the attachment face side of the annular groove in the wheel-constituting member, and the outer-rim member is mounted by being fitted over the wheel-constituting member until the outer-rim member end portion on the attachment face side contacts the flange part, because the flange part is formed so as to follow the annular groove on the attachment face side of the annular groove in the wheel-constituting member, the outer-rim member can be aligned easily in the axial direction thereof with the wheel-constituting member, and the flange part for this alignment is preferably used to form a reinforcing covering part because same makes it possible to greatly increase the strength of the join of the outer-rim member to the wheel-constituting member.

Further, the manufacturing method for the first vehicle wheel is such that when the end portion of the outer-rim member is joined to the wheel-constituting member by friction stir welding after the outer-rim member is fastened to the wheel-constituting member, a temperature rise during the joining is suppressed, meaning that the strength of the join between the wheel-constituting member and the outer-rim member can be increased while preventing a drop in the mechanical strength of the wheel as a result of thermal degradation.

What is claimed is:

1. A vehicle wheel with a construction that is split into an outer-rim member which constitutes an outer-rim part, and a wheel-constituting member comprising an integral molding that constitutes an inner-rim part and a disk part, wherein the outer-rim member end portion on an attachment face side is formed so as to be capable of fitting over the wheel-constituting member;

an annular groove is formed in an engaging face of the wheel-constituting member which engages with the outer-rim member; and the outer-rim member is integrally fastened to the wheel-constituting member by press-fitting an outer-rim member end portion on the attachment face side inside the annular groove; and wherein a reinforcing covering part that covers the outer-rim member end portion which is press-fitted inside the annular groove is formed on the attachment face side of the annular groove in said wheel-constituting member.

2. The vehicle wheel according to claim 1, wherein the end portion of the outer-rim member is joined to the wheel-constituting member by friction stir welding.

3. A vehicle wheel manufacturing method, wherein a substantially tubular outer-rim member which constitutes an outer-rim part is manufactured from a rolled plate; a wheel-constituting member comprising an inner-rim part and a disk part is manufactured by forging or casting; an outer-rim member end portion on an attachment face side is formed so as to be capable of fitting over the wheel-constituting member;

an annular groove is formed in an engaging face of the wheel-constituting member which engages with the outer-rim member; and the outer-rim member is integrally fastened to the wheel-constituting member by pressure-deforming the outer-rim member end portion on the attachment face side so that this end portion is press-fitted inside the annular groove.

4. A vehicle wheel manufacturing method wherein, on manufacturing an outer-rim member which constitutes an outer-rim part, and a wheel-constituting member comprising an integral molding that constitutes an inner-rim part and a disk part, a substantially tubular outer-rim member which constitutes the outer-rim part is manufactured from a rolled plate, said outer-rim member end portion on an attachment face side being formed so as to be capable of fitting over the wheel-constituting member;

an annular groove is formed in an engaging face of the wheel-constituting member which engages with the outer-rim member;

a wheel-constituting member in which a flange part is formed so as to follow the annular groove on the attachment face side of said annular groove, is formed by forging or casting;

an outer-rim member is mounted by being fitted over the wheel-constituting member until the outer-rim member end portion on the attachment face side contacts said flange part, whereupon the outer-rim member end portion on the attachment face side is pressure-deformed so as to be press-fitted inside the annular groove; and a flange part is then pressure-deformed so that a reinforcing covering part, which covers the outer-rim member end portion on the attachment face side which is press-fitted inside the annular groove, is formed.

5. The vehicle wheel manufacturing method according to claim 3 or 4, wherein the end portion of said outer-rim member is joined to the wheel-constituting member by friction stir welding after the outer-rim member is fastened to the wheel-constituting member.

* * * * *